US011193778B2

(12) United States Patent
Verheijen et al.

(10) Patent No.: US 11,193,778 B2
(45) Date of Patent: Dec. 7, 2021

(54) APPARATUS AND METHOD FOR VEHICLE ECONOMY IMPROVEMENT

(71) Applicant: Webfleet Solutions B.V., Amsterdam (NL)

(72) Inventors: Paul Roeland Verheijen, Heemstede (NL); Gianfranco Santoro, Amsterdam (NL); Jasper Johannes Anthonius Pauwelussen, The Hague (NL); Michael Süß, Leipzig (DE); Marco Wedekind, Leipzig (DE); Steffen Orlowsky, Dessau-Roßlau (DE)

(73) Assignee: Webfleet Solutions B.V., Amsterdam (NL)

( * ) Notice: Subject to any disclaimer, the term of this patent is extended or adjusted under 35 U.S.C. 154(b) by 181 days.

(21) Appl. No.: 15/023,003

(22) PCT Filed: Sep. 18, 2014

(86) PCT No.: PCT/EP2014/069933
§ 371 (c)(1),
(2) Date: Mar. 18, 2016

(87) PCT Pub. No.: WO2015/040131
PCT Pub. Date: Mar. 26, 2015

(65) Prior Publication Data
US 2016/0231131 A1    Aug. 11, 2016

(30) Foreign Application Priority Data

Sep. 18, 2013   (GB) .................................... 1316608

(51) Int. Cl.
*G01C 21/34* (2006.01)
*G01C 21/36* (2006.01)
*B60W 30/18* (2012.01)

(52) U.S. Cl.
CPC ... *G01C 21/3469* (2013.01); *B60W 30/18072* (2013.01); *G01C 21/3667* (2013.01);
(Continued)

(58) Field of Classification Search
CPC ........................ G01C 21/3469; G01C 21/3667
(Continued)

(56) References Cited

U.S. PATENT DOCUMENTS 7,601,095 B2 * 10/2009 Hasegawa ............... F16H 3/006
477/180
8,140,244 B2 * 3/2012 Harumoto ......... B60W 50/0098
701/104

(Continued)

FOREIGN PATENT DOCUMENTS

| DE | 102009014352 A1 | 9/2010 |
|---|---|---|
| DE | 102010052361 A1 | 2/2012 |

(Continued)

OTHER PUBLICATIONS

ISR issued Nov. 18, 2014 for international application No. PCT/EP2014/069933.
(Continued)

*Primary Examiner* — Khoi H Tran
*Assistant Examiner* — Rodney P King
(74) *Attorney, Agent, or Firm* — Patterson Intellectual Property Law, P.C.; Gary L. Montle

(57) ABSTRACT

A method of determining a coasting area is disclosed, together with methods of providing coasting information to a vehicle driver; coasting being when the vehicle is allowed to decelerate or to roll without being under power. In embodiments, the coasting area is determined by: determining an end point location of a coasting area based upon a location in map data of an expected decrease in speed of a vehicle traversing a road network represented by the map
(Continued)

data; determining a start point location of the coasting area based on at least one attribute associated with the map data proximal to the end point location; and generating coasting information indicative of the coasting area having the start point and end point locations. In other embodiments, coasting information is provided to a driver by: determining a location of a coasting area based on a location of a navigation device; and determining whether to output information indicative of the coasting area based on a current speed of travel of the navigation device and, if so, outputting an indication of the coasting area.

22 Claims, 7 Drawing Sheets

(52) U.S. Cl.
CPC ..... *B60W 2552/20* (2020.02); *B60W 2554/00* (2020.02); *B60W 2556/50* (2020.02); *Y02T 10/60* (2013.01)

(58) Field of Classification Search
USPC .......................................................... 701/409
See application file for complete search history.

(56) References Cited

U.S. PATENT DOCUMENTS

| | | | | |
|---|---|---|---|---|
| 2008/0254937 | A1* | 10/2008 | Makiyama | F16H 61/0213 477/47 |
| 2009/0240413 | A1* | 9/2009 | Miyajima | B60W 50/0098 701/70 |
| 2009/0299594 | A1* | 12/2009 | Harumoto | B60W 50/0098 701/70 |
| 2009/0319126 | A1* | 12/2009 | Miyajima | B60K 31/0066 701/41 |
| 2009/0319139 | A1* | 12/2009 | Kondou | B60W 10/06 701/55 |
| 2011/0246043 | A1* | 10/2011 | Maruyama | B60W 30/17 701/96 |
| 2011/0307122 | A1 | 12/2011 | Kanning | |
| 2012/0239462 | A1 | 9/2012 | Pursell | |
| 2015/0197247 | A1* | 7/2015 | Ichinokawa | B60W 30/143 701/93 |

FOREIGN PATENT DOCUMENTS

| | | |
|---|---|---|
| DE | 102012008227 A1 | 10/2013 |
| DE | 102012213321 A1 | 1/2014 |
| EP | 2476597 A1 | 7/2012 |
| EP | 2591968 A2 | 5/2013 |
| GB | 2284055 A | 5/1995 |
| GB | 2452579 A | 3/2009 |
| GB | 2500574 A | 10/2013 |
| JP | 2010143304 A | 7/2010 |
| JP | 2012116428 A | 6/2012 |
| WO | 2010030341 A1 | 3/2010 |
| WO | 2011016709 A1 | 2/2011 |
| WO | 2013012926 A1 | 1/2013 |
| WO | 2013138798 A1 | 9/2013 |

OTHER PUBLICATIONS

Search report dated Mar. 3, 2014 for United Kingdom application No. GB1316608.7.
Search report dated Mar. 7, 2014 for United Kingdom application No. GB1316609.5.

* cited by examiner

APPARATUS AND METHOD FOR VEHICLE ECONOMY IMPROVEMENT

CROSS-REFERENCE TO RELATED APPLICATIONS

The present application is a National Stage of International Application No. PCT/EP2014/069933, filed on Sep. 18, 2014, and designating the United States, which claims benefit to United Kingdom Patent Application 1316608.7 filed on Sep. 18, 2013. The entire content of these applications is incorporated herein by reference.

FIELD OF THE INVENTION

This invention relates to apparatus and methods associated with mobile devices, and preferably navigation systems. Illustrative embodiments of the invention relate to portable navigation devices (so-called PNDs), in particular PNDs that include Global Positioning System (GPS) signal reception and processing functionality. Other embodiments relate, more generally, to any type of mobile processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, on-line route planning and navigation facilities exist that allow a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

Increasingly economical driving is an important consideration with increasing fuel prices. Whilst hybrid and other technologies, such as electric vehicles and the like, provide alternatives to fossil-fuel powered vehicles, economical driving techniques remain important.

The present invention provides apparatus and method for encouraging economical driving.

SUMMARY OF THE INVENTION

According to a first aspect of the present invention, there is provided a method of determining a coasting area, comprising:

determining an end point location of a coasting area based upon a location in map data of an expected decrease in speed of a vehicle traversing a road network represented by the map data;

determining a start point location of the coasting area based on at least one attribute associated with the map data proximal to the end point location; and generating coasting information indicative of the coasting area having the start point and end point locations.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

The present invention extends to a system for carrying out a method in accordance with any of the aspects or embodiments of the invention herein described.

In accordance with a second aspect of the invention there is provided a system for determining a coasting area, comprising:

means for determining an end point location of a coasting area based upon a location in map data of an expected decrease in speed of a vehicle traversing a road network represented by the map data;

means for determining a start point location of the coasting area based on at least one attribute associated with the map data proximal to the end point location; and means for generating coasting information indicative of the coasting area having the start point and end point locations.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

In general, the system of the present invention in any of its embodiments may be at least one processing device. The or a processing device may be a device of a mobile device, such as a navigation device, whether a PND or an integrated device, or may be a device of a server.

In embodiments, the end point location is determined based upon a speed limit or historic speed associated at least one road segment represented by the map data. Additionally or alternatively, the end point location may be based upon a differential in speed limit or historic speed associated with first and second interconnected road segments represented by the map data. Additionally or alternatively, the end point location may be determined based upon a speed of traffic flow associated with at least one road segment identified in traffic information. Additionally or alternatively, the end point location may be determined based upon a type of road feature connecting first and second road segments. Additionally or alternatively, the end point may be determined based upon a gradient.

In embodiments, the method comprises determining a start point location of the coasting area based upon the end point location and a coasting distance. The coasting distance may be selected according to the expected decrease in speed. The expected decrease in speed may be a speed differential between first and second road segments. The speed differential may be a speed differential between a speed limit, historic speed or speed of traffic flow associated with the first and second road segments.

In embodiments, the method comprises coasting information indicative of the coasting area. The coasting information may be provided to one or more navigation devices.

In embodiments, the method comprises outputting an indication of the coasting area. The indication of the coasting area may be output on a display screen of a navigation device.

In embodiments, the start point location of the coasting area is based, at least in part, on a current speed of travel of the navigation device.

According to another aspect of the invention, there is provided a method of providing coasting information to a vehicle driver, comprising:

determining a location of a coasting area based on a location of a navigation device;

determining whether to output information indicative of the coasting area based on a current speed of travel of the navigation device and, if so, outputting an indication of the coasting area.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

The present invention extends to a system for carrying out a method in accordance with any of the aspects or embodiments of the invention herein described. Thus, in accordance with a further aspect of the invention there is provided a system for providing coasting information to a vehicle driver, comprising:

means for determining a location of a coasting area based on a location of a navigation device; and means for determining whether to output information indicative of the coasting area based on a current speed of travel of the navigation device and, if so, outputting an indication of the coasting area.

In general, the system of the present invention in any of its embodiments may be at least one processing device. The or a processing device may be a device of a mobile device, such as a navigation device, whether a PND or an integrated device, or may be a device of a server.

In embodiments, the location of the coasting area is determined from coasting information received by a navigation device, e.g. in any one of the various manners described above.

In embodiments, the determining whether to output information indicative of the coasting area is determined based upon a difference between the current speed of travel and a target speed. The target speed may be a speed associated with a road segment following an end point of the coasting area. Additionally or alternatively the target speed may be one of a speed limit, historic speed or speed of traffic flow associated with the road segment following the end point.

In embodiments, the indication of the coasting area is output when the difference between the current speed of travel and the target speed is at least a predetermined speed.

In embodiments, the indication of the coasting area is output on a display screen of a navigation device.

The methods in accordance with the present invention may be implemented at least partially using software, e.g. computer programs. The present invention thus also extends to a computer program comprising computer readable instructions executable to perform a method according to any of the aspects or embodiments of the invention.

The invention thus also extends to a computer software carrier comprising software which when used to operate a system or apparatus comprising data processing means causes, in conjunction with said data processing means, said apparatus or system to carry out the steps of the methods of the present invention. Such a computer software carrier could be a non-transitory physical storage medium, such as a ROM chip, CD ROM or disk, or could be a signal, such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Various embodiments of the present invention will now be described with reference to the accompanying drawings, in which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of mobile processing device that is configured to execute navigation software so as to provide route planning and navigation functionality. It follows therefore that in the context of the present application, a navigation device is intended to include (without limitation) any type of mobile route planning and navigation device, irrespective of whether that device is embodied as a PND, a navigation device built into a vehicle, or a mobile telephone or portable digital assistant (PDA)) executing route planning and navigation software.

Figure 1:
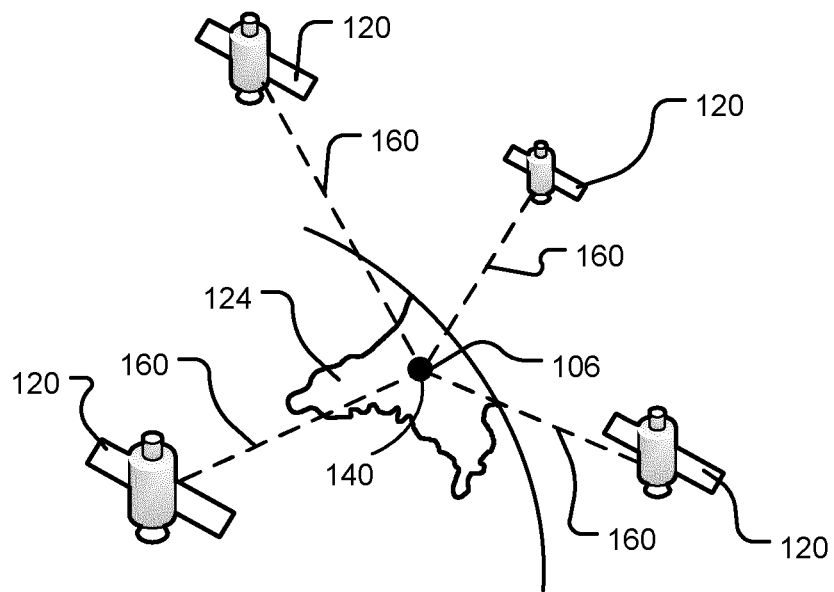
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
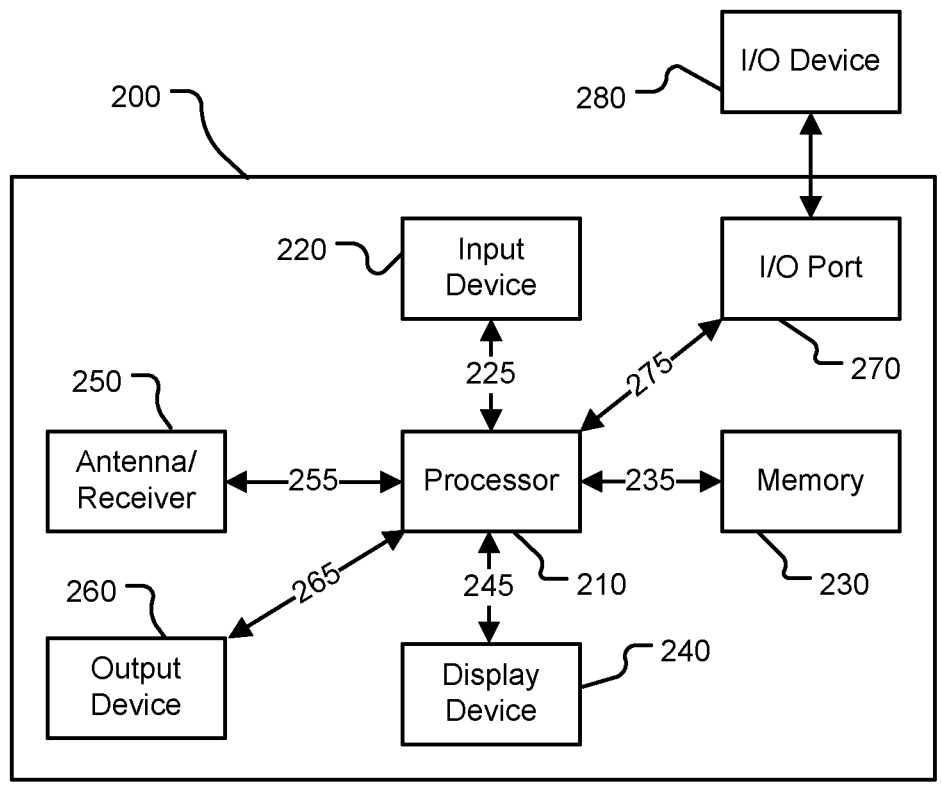
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
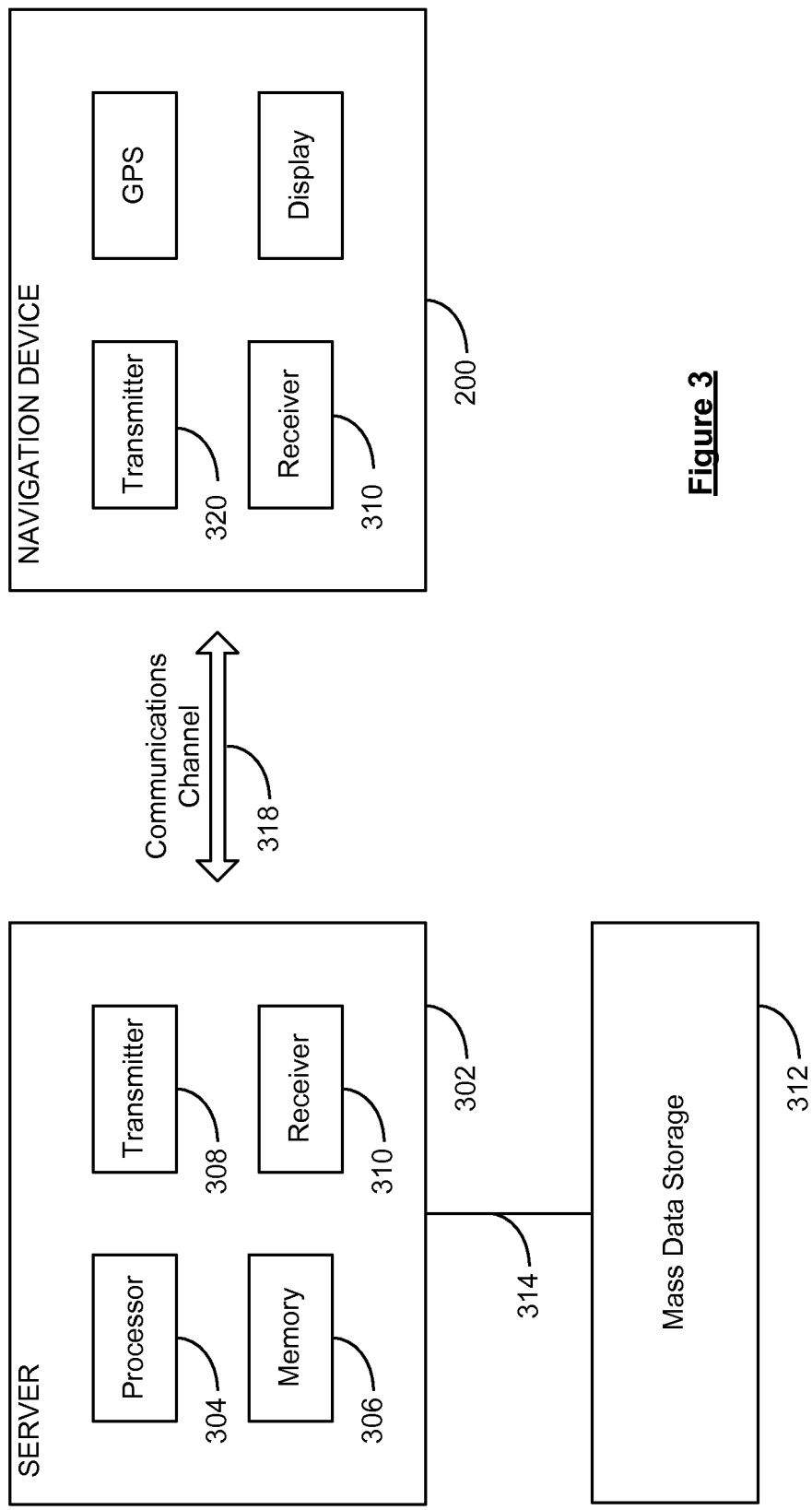
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4:
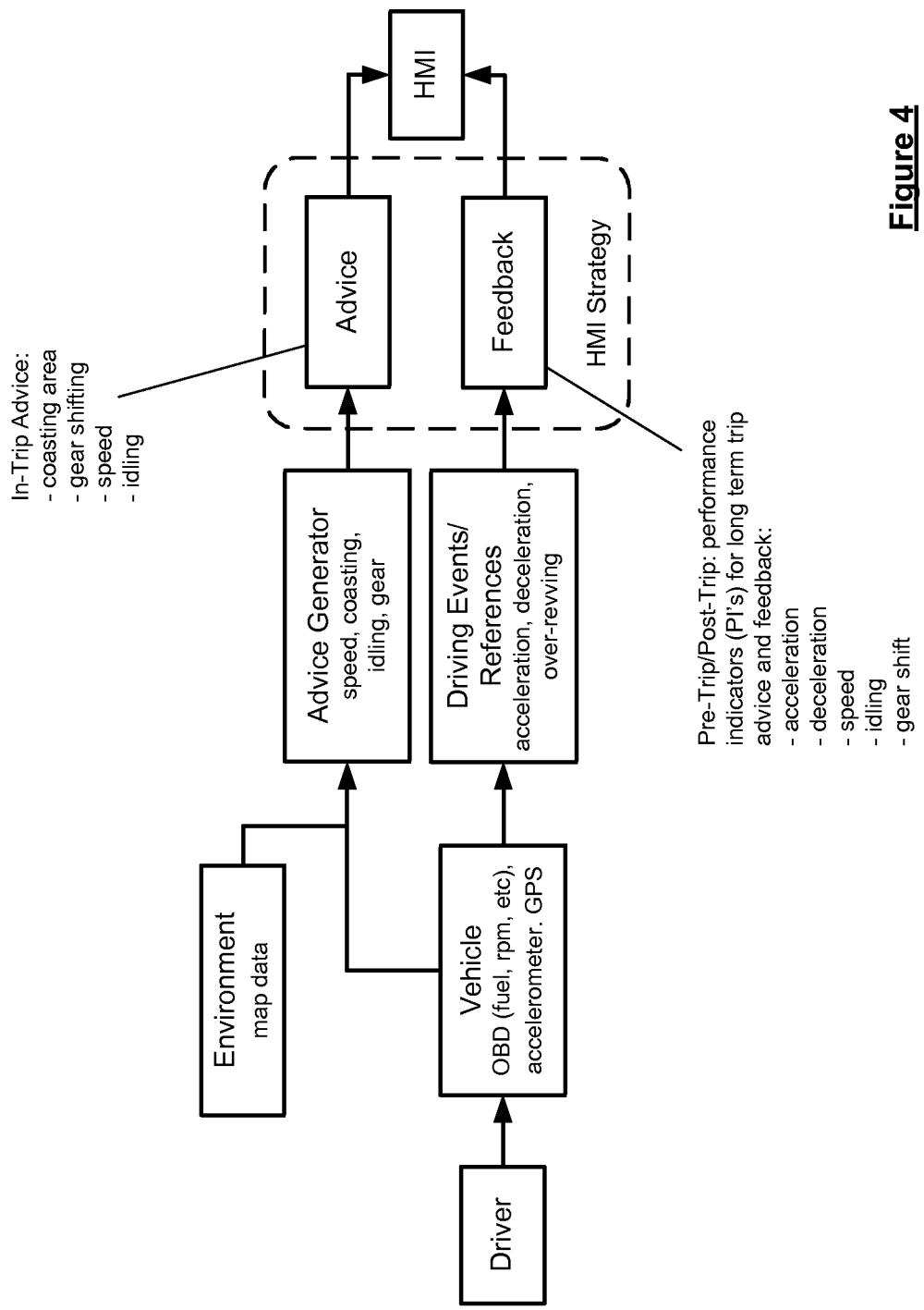
FIG. 4 is a schematic illustration of a system for providing active driver feedback to a driver in order to promote more economical driving.

Embodiments of the present invention relate to a system for providing active driver feedback to a driver in order to promote more economical driving. An exemplary such system is depicted in FIG. 4. As shown in FIG. 4, the active driver feedback comprises two components: feedback on current or historic driving performance (to be studied by the driver before beginning a trip or after having completed a trip); and advice on how driving styles can be modified to achieve more economical driving (which is typically given during a trip). The advice may comprise advice on an optimal or "green" speed to achieve maximum economical results; times/areas when "coasting" is possible (as discussed in more detail below); gear choice and when to change gear; etc. The feedback may comprise counts of events with harsh acceleration or declaration, speeding events (with respect to the speed limit and/or green speed), inefficient gear changes (over-revving), etc. The feedback may also comprise indicators as to how current and/or historic driving performance equates to predetermined goals, which may be set by the driver or may be set remotely by a fleet manager (again as will be discussed in more detail below).

Figure 5:
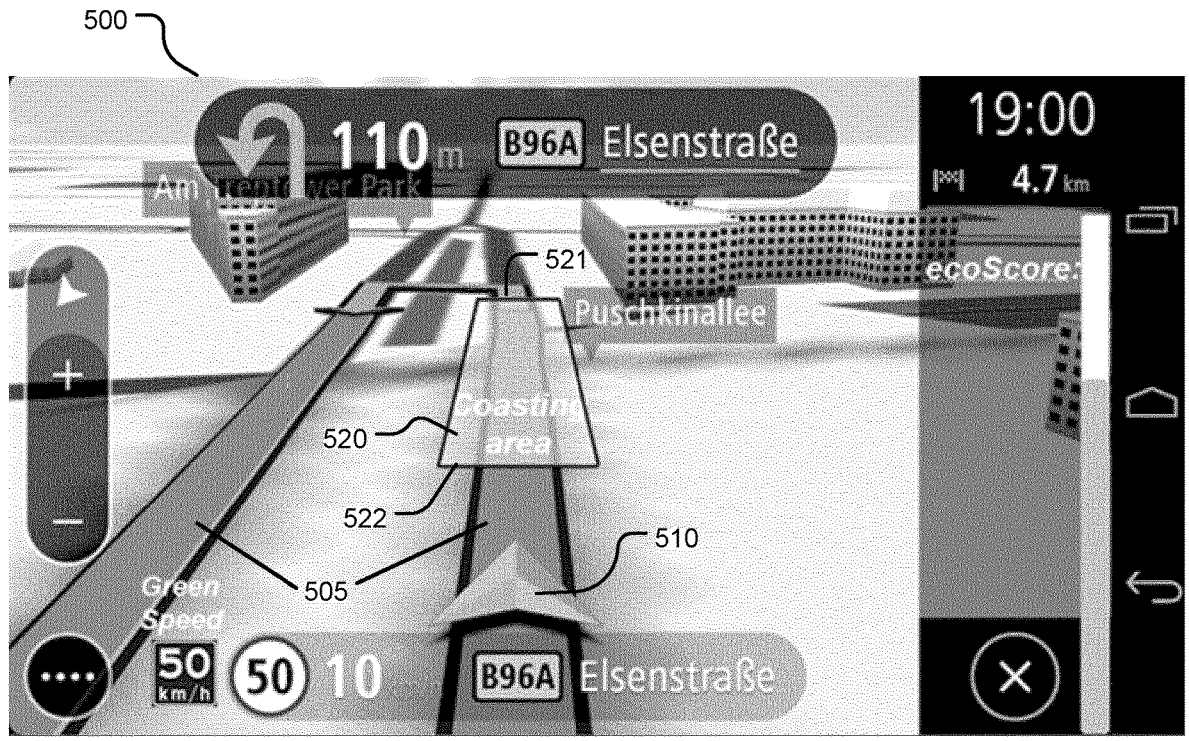
FIG. 5 shows a preferred embodiment of a navigation device user interface according to an embodiment of the invention.

FIG. 5 illustrates a user interface 500 which is generated, at least in part, by an eco-driving software module (EDM), that can be executed by a processor of a mobile navigation device, for output to a user via the display screen 240. The user interface comprises an indication of one or more road segments 505 proximal to a location of a navigation device (and also a user of the navigation device 200) as indicated with icon 510. The icon 510 also indicates a direction of travel along the current road segment 505. The user interface also indicates an appearance of one or more buildings in the vicinity of the current location 510, although it will be realised that in other embodiments such representation of buildings is not provided. The user interface 500 further comprises an indication of a coasting area 520. The coasting area is located on an upcoming road segment based on the current location 510 of the navigation device 200. The upcoming road segment may be determined based on a route programmed into the navigation device 200, or based on an expected upcoming road segment such as when the navigation device is operative in the "free-driving" mode.

The coasting area 520 is indicative of a portion of a road within which the user may allow their vehicle to coast. By "coasting" it is meant that the vehicle is allowed to naturally decelerate or to roll without being under power. In other words, the term coasting refers to a time when the driver lifts a foot off the accelerator (or gas pedal) to reduce vehicle speed without using brakes. In this way, a fuel economy of the vehicle may be improved. The fuel economy of the vehicle may be improved whether the vehicle is a fossil-fuel (petrol, diesel, gas) powered vehicle, electric powered vehicle or a combination thereof. The coasting area 520 is determined by the EDM as having an end location 521 and a start location 522. As will be explained, the end location is a geographic location of an expected change in speed of the vehicle. The start point location 522 of the coasting area is 520 is based on one or more of at least one attribute associated with digital map data proximal to the end point location 521 or a current vehicle speed. At the end point location 521 the vehicle may be expected to come to a complete stop, such as at a junction or traffic lights, or may be expected to travel at a reduced speed, such as along a road segment having a lower speed limit than a current road segment, or in a traffic jam. In FIG. 5 the coasting area 520 is indicated as an overlay present on a portion of a displayed upcoming road segment 505. It will be realised, however, that the coasting area 520 may be displayed in another manner, such as by indicating the portion of the upcoming road segment corresponding to the coasting area 520 in another colour to the other portion(s) of the road segment, or by only indicating the start and end point locations 522, 521.

Figure 6:
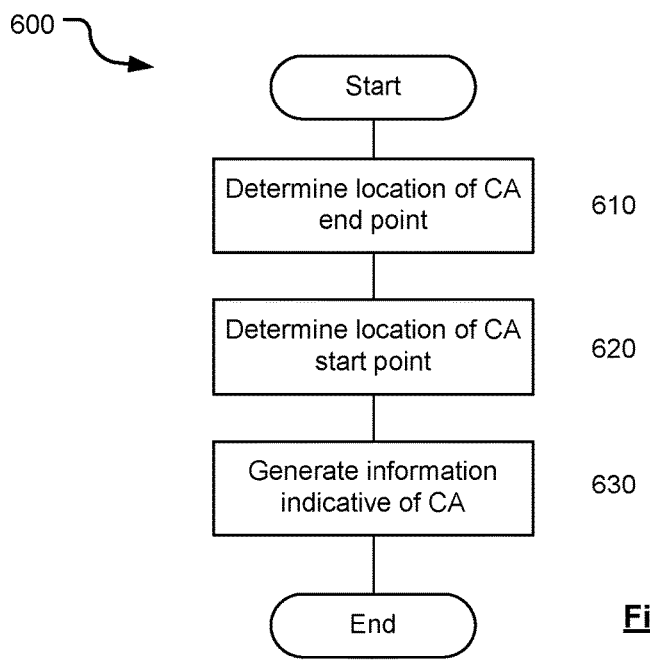
FIG. 6 illustrates a method according to an embodiment of the invention for determining a location of a coasting area.

FIG. 6 illustrates a method 600 according to an embodiment of the invention. The method 600 is a method of determining coasting information. The method 600 may be performed by the EDM which operatively executes on the processor 210 of the navigation device 200. However the method 600 may also be performed by a computing apparatus such as a server computer. The method may be performed by the server computer in response to information received from a navigation device, or in an "off line" manner. The coasting information comprises an indication of the coasting area 520. The coasting information may be output in the form of data or a file to one or more navigation devices when performed by the server computer.

The method 600 comprises a step 610 of determining an end point 522 location of a coasting area (CA) 520. The end point 522 location of the coasting area 520 may be based upon a location of an expected drop in speed of a vehicle travelling in a road network. In some embodiments, the expected drop in speed is present on a route, information indicative of which may be stored in the memory 230 of the navigation device 200 or the server computer. The route may have been determined between start and destination locations entered or selected by the user, or may have been automatically determined by the navigation device 200, such as a result of a determination that the user is following a previous journey. However in other embodiments, the expected drop in speed may lie on an expected upcoming road segment such as road segment which lies directly ahead of the current location 510 of the navigation device 200 wherein it is assumed that the user will continue to follow a straight ahead path.

The expected drop in speed may be based on digital map data indicative of a geographic area either alone or in combination with additional information. The expected drop in speed may be associated with features or attributes of the digital map data such as one or more of speed limit attributes associated with road segments in the digital map data; road network features which may comprise junctions, turns or roundabouts which may require a vehicle to slow or stop.

The additional information may comprise historic speed information indicative of an actual real-world travelling speed on road segments of the digital map data. Such speed information may be based on a historic speed of one or more vehicles along the respective road segments. The historic speed information may be as described in WO 2009/053411 A1, which is herein incorporated by reference, and thus may be an expected speed of travel (for the appropriate time) for each segment of the electronic map.

The additional information may comprise traffic information received by the navigation device 200 or server computer. The traffic information may be indicative of one or more road segments having a reduced traffic speed due to, for example, an accident or a heavy volume of traffic. The traffic information may comprise an expected speed of travel for those segments, or portions of segments, deemed to be congested; this "live" expected speed of travel will be used in replace of the "historical" expected speed of travel.

The additional information may comprise topological information indicative of a topology of a geographic area associated with the digital map data. In some embodiments the topological information may be included within the digital map data. The topological information provides information indicative of a gradient or slope of road segments, such that a vehicle may be allowed to coast along those road segments.

Figure 7:
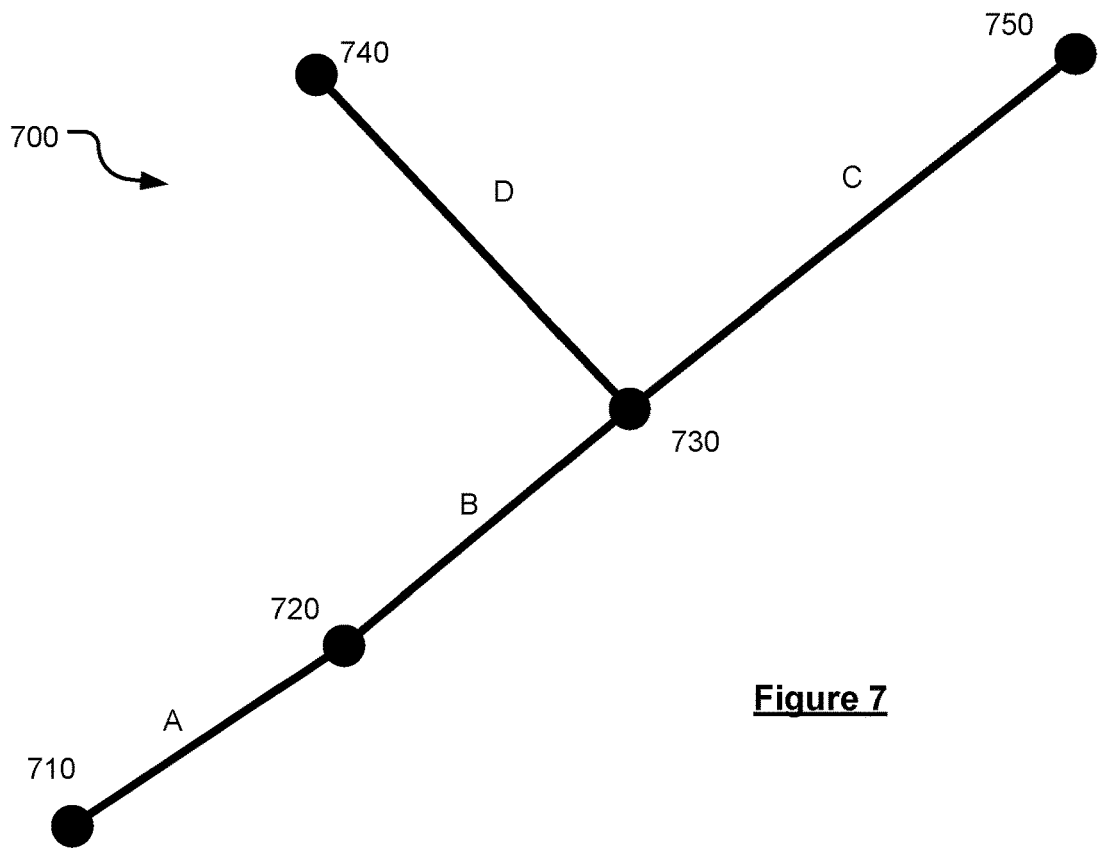
FIG. 7 illustrates a portion of digital map data.

FIG. 7 illustrates an exemplary portion of digital map data 700. The digital map data 700 may be formed from information indicative of segments interconnecting nodes, wherein the segments represent a navigable network. Alternatively the map data 700 may be formed by nodes having associated attributes wherein at least some attributes are indicative of connections between nodes having common attributes representing a connection there-between. The connections are indicative of navigable segments in the real world. In FIG. 7 each segment is associated with an identifier such as letters A-D shown in FIG. 7.

In some embodiments, a node between two road segments is selected as the end point of the coasting area when the road segments are non-linear. Road segments may be considered as non-linear when an angle between their longitudinal axes (at least in region proximal to their connection) differs by more than a predetermined degree. First and second road segments may be interconnected by a node representing a road feature such as a junction or intersection or when the road segments have differing attributes, such as speed limits. Nodes indicative of predetermined types of road feature may be selected as the end point of the coasting area 520. Interconnections between road segments may be selected as the end point of the coasting area when predetermined types of attribute differ between the road segments, for example when a speed limit changes between road segments. In some embodiments, the attribute may be required to differ by more than a predetermined amount, for example by more than a predetermined speed.

Route information currently stored in the memory 230 of the navigation device 200 is indicative of a route formed by road segments A, B, D. At node 730 the route, therefore, comprises a turn from road segment B to D. At node 730 it may be assumed that, to execute the turn, the vehicle will be required to decrease speed, depending on a type of road-feature present at the node 730. For example, if the road-feature present at node 730 is a junction or roundabout it may be assumed that the vehicle has to stop completely. Therefore, one or more predetermined types of road feature may be selected as the end point of the coasting area. In some embodiments a node, such as node 730, representative of those road features may be selected as the end point 522 of the coasting area 520.

If the road segment D is a slip road to another road segment (not shown) it may be assumed that the vehicle is not required to stop but may traverse the road segment D at a speed associated therewith, such as a speed limit or actual real-world travelling speed associated with the road segment D. In this case, the interconnection between segments B and D represented by node 730 may be selected as the end point of the coasting area when the speed limits or actual real-world travelling speeds associated with the road segments B and D differ by more than a predetermined amount. The predetermined amount may be, for example, 20 kmh$^{-1}$ although it will be realised that this is exemplary and that other predetermined speed differentials may be chosen.

Although the speed differential between segments B and D has been described above as the end point 522 for the coasting area 520, wherein road segment D represents a turn or departure from road segments B and C, it will be realised that an interconnection between substantially linear or continuous road segments may be chosen as the end point for the coasting area when predetermined types of attribute differ between the road segments. For example, road segments A and B are substantially linear and may represent a continuous road. However the interconnection, represented by node 720, may be indicative of a change in speed limit attribute between the road segments. Therefore the node 720 may be selected as the end point of the coasting area even though no turn exists between road segments A and B. The change in speed limit may be more than the predetermined amount for the node 720 to be selected as the end point 522 of the coasting area 520.

As noted above, road segments in the digital map data may be associated with historic speed information indicative of an actual speed at which it is expected the road segments to be traversed by the user. An interconnection between road segments may be selected as the end point of the coasting area when the historic speed information for the interconnected road segments differs. The difference in historic speed may be more than the predetermined amount for the interconnection to be selected as the end point 522 of the coasting area 520. For example, historic speed information for segment A may differ from the historic speed information for road segment B by more than the predetermined amount such that node 720 is selected as the end point 522 for the coasting area 520.

The end point 522 of the coasting area 520 may be selected in some embodiments of step 620 based, at least in part, on received traffic information. Traffic information may be received wirelessly by the navigation device 200 indicative of a reduced speed of travel on one or more road segments. For example, the traffic information may indicate a speed of travel on road segment B is reduced to 20 km$^{-1}$. In contrast, a speed limit associated with road segment A may be 90 kmh$^{-1}$ and historic speed information associated with road segment A may be 75 kmh$^{-1}$. Therefore, a comparison between one or both of the speed limit and the historic speed information associated with road segment A and speed of travel of adjoining road segment B provided by the traffic information indicates a speed differential of 70 kmh$^{-1}$ and 55 kmh$^{-1}$ respectively. Therefore the node 720 interconnecting road segments A and B may be selected as the end point 522 of the coasting area 520.

It will realised that a location may be selected as the end point 522 for the coasting area 520 which does not correspond to an end of a road segment. That is, a point within a segment may be selected as the end point 522 for the coasting area 520. For example, the traffic information may indicate a reduced speed of travel along one or more road segments between locations identified by geographic coordinates which do not correspond to ends of road segments. Thus a location part-way along a road segment may be selected as an end point of the coasting area.

In some embodiments, the end point 522 of the coasting area 520 is selected based upon a gradient of a road segment. The end point may be selected to be at an end of a road segment having a downward or negative gradient. The EDM may determine the location of the end point 520 being at an end of a road segment of at least a predetermined length, for example 500 m, and/or of at least a predetermined gradient. In some embodiments, the end point may be located at an end of first and second road segments each of at least a predetermined length which are interposed by a portion of road up to a predetermined length and/or gradient. For example, the EDM may determine the end point location at an end of first and second section of road having a gradient of at least −4% which are interposed by a section of road of 80 m having a gradient of +2%. It will be realised that these figures are exemplary.

Whilst the above description has been associated with a route comprising road segments A, B D it will be realised that embodiments of the invention may be used without route information. For example, the current location 510 of the navigation device may lie along segment A and the navigation device may be operational in the "free-driving" mode. In this mode, the EDM may assume that the navigation device 200 will continue to travel in a straight-ahead path, i.e. along road segments A, B C. The above described techniques may be used to determine the location of the end-point along the straight-ahead path of segments A, B, C.

In step 620 a location of a start point of the coasting area is determined. The start point 522 of the coasting area may correspond to a geographical location at which the vehicle may be allowed to coast to the end point. The start point may be selected to allow the vehicle to gradually decelerate to the end point 521 selected in step 610. The location of the start point 522 may be selected as a location a predetermined distance from the end point 521 of the coasting area. For example, the start point may be 250 m from the end point selected in step 620. The start point 522 may lie along a road segment between the current location 510 and the end point 521.

The location of the start point may be selected based upon vehicle information indicative of a type of vehicle with which the navigation device 200 is associated. For example a user stored in or accessible to the navigation device 200 may indicate a predetermined category of vehicle with which the navigation device 200 is being used. The category may be one of: passenger car (PC), e.g. motorcycle, car, etc; light commercial vehicle (LCV), e.g. van, etc; heavy goods vehicle (HGV), e.g. truck, lorry, etc; and public service vehicle (PSV), e.g. bus, etc. The predetermined types of vehicle may be indicative of a stopping or coasting distance of the vehicle. The location of the start point 522 may be a predetermined distance from the end point 521, and wherein the predetermined distance may be selected, at least in part, according to the vehicle type. For example, a predetermined distance of 200 m may be used for a car, whereas a predetermined distance of 400 m may be used for a PSV.

Additionally, or alternatively, the predetermined distance may be selected according to the speed deferential associated with the end point 522 of the coasting area 520, e.g. a speed differential between the first and second road segments. For example, the coasting distance may be selected from amongst a plurality of predetermined coasting distances according to the speed differential. The table below provides four categories of speed differential and corresponding coasting distances. It will be realised that the number of categories, selection of speed differential limits and coasting distances is exemplary. It will further realised that the predetermined coasting distance may be selected in combination with the vehicle type, such that a first coasting distance is selected for a first vehicle type, whereas a second coasting distance is selected for a second vehicle type for the same speed differential.

| Speed differential (kmh$^{-1}$) | Coasting distance (m) |
|---|---|
| V > 100 | 200 |
| 70 < V < 80 | 150 |
| 50 < V < 70 | 100 |
| V < 50 | 50 |

Example Speed Differentials and Corresponding Coasting Distances

Additionally, or alternatively, the start point 522 of the coasting area, and thus the length of the coasting area, may be determined dynamically according to a speed deferential between the current vehicle speed and the target speed, i.e. the lower speed associated with path to be travelled after passing the end point 522.

In some embodiments one or both of a location of the navigation device 510 and a traffic density proximal to the current location or end point 521 location of the coasting area 520 are used to determine the location of the start point. The location of the navigation device 510 may be determined to correspond to an area type of one of a predetermined number of categories such as urban, semi-urban, major road, rural etc. In some embodiments the area type may be used, at least in part, to select the location of the start point 522 of the coasting area 520. The coasting distance may be at least partly selected based on the area type. For example, a longer coasting area may be selected for a particular speed differential in a rural area than in an urban area to avoid disrupting other drivers by longer coasting distances. In other embodiments, traffic density information, which may form part of received traffic information, may be used to determine the start point of the coasting area by selecting the coasting distance in a similar manner to the area type.

In step 630 coasting information indicative of the coasting area is generated. The coasting information may be provided from a server to a navigation device 200 via the communications channel 318, or may be provided in the form of a file comprising coasting information relating to a plurality of coasting areas. In some embodiments, when the method is performed by the EDM of the navigation device 200, the coasting information is generated and output by the navigation device 200. The coasting information may be output audibly and/or visually. In the embodiment of FIG. 5 the coasting area 520 is visually indicated on the display device 240. The coasting area 520 is indicated as a region in which the user may allow the vehicle to coast.

Figure 8:
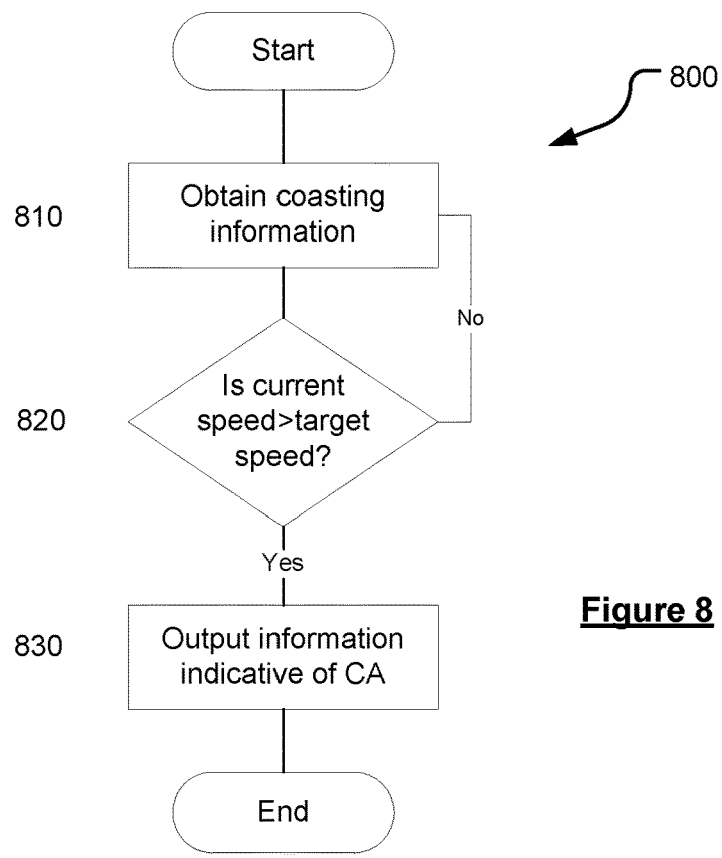
FIG. 8 illustrates a method according to an embodiment of the invention for outputting coasting information.

Some embodiments of the invention relate to a method of outputting coasting information to a driver of a vehicle. A method 800 of outputting coasting information is shown in FIG. 8. The method may be performed by the EDM operatively executing on the processor of the navigation device 200.

The method 800 comprises a step 810 of obtaining coasting information. The coasting information may be obtained by the navigation device 200 responsive to a location of the navigation device 200 from the server 302 via the communications channel 318. The navigation device 200 may request, or be provided with by the server 302, coasting information based on the current location of the navigation device 200. The coasting information may be requested or provided for a geographic region within a predetermined distance of the navigation device's current location or for one or more upcoming road segments. The road segments may be one or more road segments directly ahead of the navigation device's current path, or may form part of a route currently being followed by the navigation device 200. Step 810 may comprise the EDM performing the method illustrated in FIG. 6 to obtain the coasting information, wherein the coasting information is generated by the EDM.

Step 820 comprises determining whether a current speed of travel of the navigation device, and the vehicle with which the navigation device is associated, is greater than a target speed. The target speed may be a speed associated with the end point 521 of the coasting area 520. For example, where the end point is associated with a road feature, such as a junction, at which the user is expected to stop, the target speed is 0. The target speed may be a speed associated with of a road segment at the end point of the coasting zone, such as an upcoming road segment having a lower speed limit, historic speed or traffic speed as indicated by traffic information, for example road segment B in the above example.

In some embodiments of step 820 it is determined whether the current speed is greater than the target speed by a predetermined speed. The predetermined speed may be, for example, 20 kmh$^{-1}$ although it will be realised that this is merely exemplary and that other speeds may be used.

If the current speed is greater than the target speed, or greater than the target speed by more than the predetermined amount, the method moves to step 830. If not, then the method returns to step 810 to await further coasting information.

In step 830 information indicative of the coasting area is output to the user by the navigation device 200. The coasting information may be output audibly and/or visually. In the embodiment of FIG. 5 the coasting area is visually indicated on the display device 240. The coasting area is indicated as an area 520 in which the user may allow the vehicle to coast.

In summary, and as described above, the term "coast" refers to a driver lifting their foot over the accelerator (or gas) pedal typically with the vehicle being in gear. when coasting the engine is kept running through the kinetic energy of the vehicle. Coasting leads to a reduction in fuel consumption through two effects: (i) the engine cuts off any fuel injection while coasting, such that the engine does not use any fuel (as long as the engine speed is above the idle speed); and (ii) the longer a vehicle coasts, as opposed to maintain a current speed and then braking, the more fuel consumption is reduced.

Coasting zones are areas in which coasting is possible, and these zones, once determined, are shown as coasting advices to the driver. Such advices can be shown to the user as an icon on a schematic view of the upcoming portion of a predetermined or a predicted route, or as an overlay on a graphical depiction of the predetermined or the predicted route.

The detection of a coasting zone, and the associated length of such a coasting zone, can, in embodiments, be performed using the following algorithm.

Based on a current position of a vehicle, and a predetermined or predicted route being following by the vehicle, digital map data can be used to determine upcoming sections of the road network that lend themselves to coasting, such as: decreases in speed limit, roundabouts, motorway exits and intersections. In the case of intersections, these can include, for example, intersections where the road class changes (typically from a higher class to a lower class, and is thus indicative of a required reduction in speed) and intersections where the turn angle is greater than a predetermined value, such as 50° (since this again would typically be indicative of a required reduction in speed). Each of these "events" is preferably associated with a target speed, said target speed being the speed at which the vehicle will typically need to slow down to in order to traverse the section associated with the event. The target speed can be taken from the digital map data, or determined using one or more heuristics as required.

The length of a coasting zone is determined using the current vehicle speed and the upcoming speed reduction, i.e. the above described target speed, together with a deceleration of the vehicle during coasting, e.g. due to air resistance, engine resistance, gradient, etc. More specifically, a time is determined to reduce the speed of the vehicle from the current speed to the target speed in view of the determined deceleration, and then an associated distance determined. Since the deceleration is typically dependent on the current speed, a distance is determined for each speed value between the current speed and the target speed, and each individual distance aggregated (or concatenated) to determine the length of the coasting zone.

Embodiments of the present invention also relate to a method of managing driving performances within a fleet of vehicles equipped with mobile devices, in order to promote more economical driving practices. For example, it has been recognised that driving economy, that is fuel consumption, can be improved through the use of good driving practices, such as coasting to a slower speed or stop as described above. Some embodiments of the invention aim to encourage such driving practices amongst a fleet of vehicle drivers, for example within a fleet of commercial vehicles. The practices are encouraged by allowing a user, such as a fleet manager, to set one or more goals for the drivers of the vehicle fleet, wherein each goal is the achievement of one or more economical driving events.

The mobile device may be a vehicle management or monitoring device, or a vehicle tracking device. Such devices may be built into or attached to a vehicle, for example a commercial vehicle, to allow remote monitoring of the vehicle's location either as part of a fleet management system or for security purposes. Such devices may not be arranged to receive user interaction, i.e. from a driver of the vehicle. The mobile device may alternatively be a navigation device, such as that used to provide navigation guidance to a user. The navigation device may be formed by a mobile phone, tablet computer or other portable computing device executing navigation software. The mobile device may be arranged to receive data from the vehicle with which it is associated, such as by being communicably coupled with a communication bus of the vehicle, for example, CAN bus, from which vehicle data may be received. The vehicle data may comprise information indicative of fuel consumption of the vehicle (current or average), speed, engine revolutions (or "revs"), gear selection. The mobile device may, alternatively or additionally, determine information about the vehicle's behaviour from one or more of the location of the device e.g. from received GPS signals and one or more accelerometers within the device. For example, the speed of the vehicle may be determined from the location of the navigation device over time and a severity of acceleration and/or braking based thereon, or from the accelerometer.

Economical driving events may comprise one or more of a lack of excess speeding; a lack of idling; fuel consumption; lack of hard acceleration; travelling between predetermined speeds (determined to be economical); use of low revs, a lack of high revs or engine revs between upper and lower limits; coasting within coasting areas as described above. It will be realised that this is list is not intended to be exhaustive.

Figure 9:
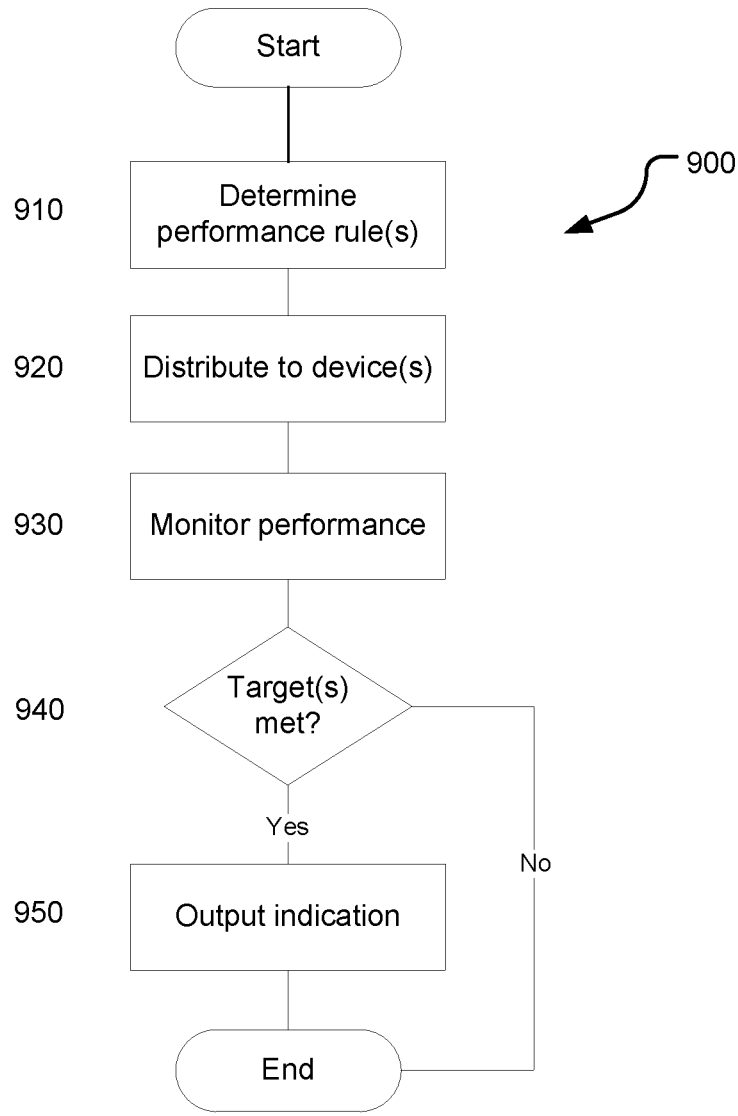
FIG. 9 illustrates a method according to an embodiment of the invention for using performance targets.

FIG. 9 illustrates a method 900 according to an embodiment of the invention. Whilst the method 900 will be explained with reference to navigation devices, it will be realised that the method 900 may be performed in association with mobile devices, as explained above.

The method comprises a step 910 of determining one or more performance targets or rules. The performance targets relate to economical driving behaviour amongst a fleet of vehicles. That is, the performance targets are targets which encourage economical driving of the fleet of vehicles.

The method may be performed by a user, such as a fleet manager. Thus step 910 may be performed with respect to a computer, such as a desktop computer, although this is not limiting. The computer may be the computer associated with the fleet manager. Step 910 may comprise the user accessing a website interface in order to establish the one or more performance targets, such as by selecting an appropriate choice of one or more targets and, dependent on the selected targets, entering one or more associated values. For example, the user may select a target indicating that a predetermined number of coasting areas must be achieved. That is, a vehicle must coast through the predetermined number of coasting areas. The predetermined number may be a predetermined percentage such as 50%. The targets may be selected to be appropriate to one or more vehicles. For example the rule may be associated with one or more particular vehicles of the fleet, or the rule may be associated with all vehicles of the fleet.

In step 920, which may be omitted in some embodiments, the one or more targets determined in step 910 are distributed to one or more navigation devices. Thus step 920 may comprise communicating performance target data from the computer of the computer used in step 910 to the devices. It will be realised that step 920 is optional since, in some embodiments, conformance with the one or more targets may be determined by a central computer rather than the navigation device. The central computer may be the computer associated with the fleet manager referred to in step 910. In step 920 information indicative of the one or more targets and any associated parameters is communicated to the navigation device(s).

In step 930 a performance of each vehicle is monitored by the device associated with the vehicle, such as the navigation device 200. The performance may be monitored from on-board measurements made by the navigation device 200, such as location and/or acceleration measurements made by receivers or sensors within the navigation device, from data received from the vehicle with which the device is associated, such as data indicative of the vehicle's engine speed, received by the device communicably coupled with the vehicle, or from a combination of on-board measurements and received data. Step 930 may generate performance data indicative of the driving behaviour of each vehicle.

In step 940 it is determined whether the one or more performance targets have been met. The determination is made with respect to the performance data generated in step 930. The determination may be made by the device with respect to the performance target data received in step 920. Alternatively, the determination may be made by another computing device, such as a server computer or the computing device associated with the fleet manager used in step 910. In this case, performance data determined in step 930 is communicated from the respective device to the computing device making the determination. The determination is then made with respect to the received performance data and the performance target data. If the targets have been met then an indication is output in step 950. If the targets have not been met then the method may move to finish after step 940. However, in other embodiments, an indication of the failure to comply or to meet the one or more performance targets may be output before the method ends.

In step 950 an indication of conformance with the one or more performance targets is output. The indication may be output by the device, such as in the case that the device is a navigation device 200 having a display screen 240. Alternatively or additionally the output may be output by the computing device associated with the fleet manager, such that the fleet manager may observe compliance with the performance targets.

Figure 10A:
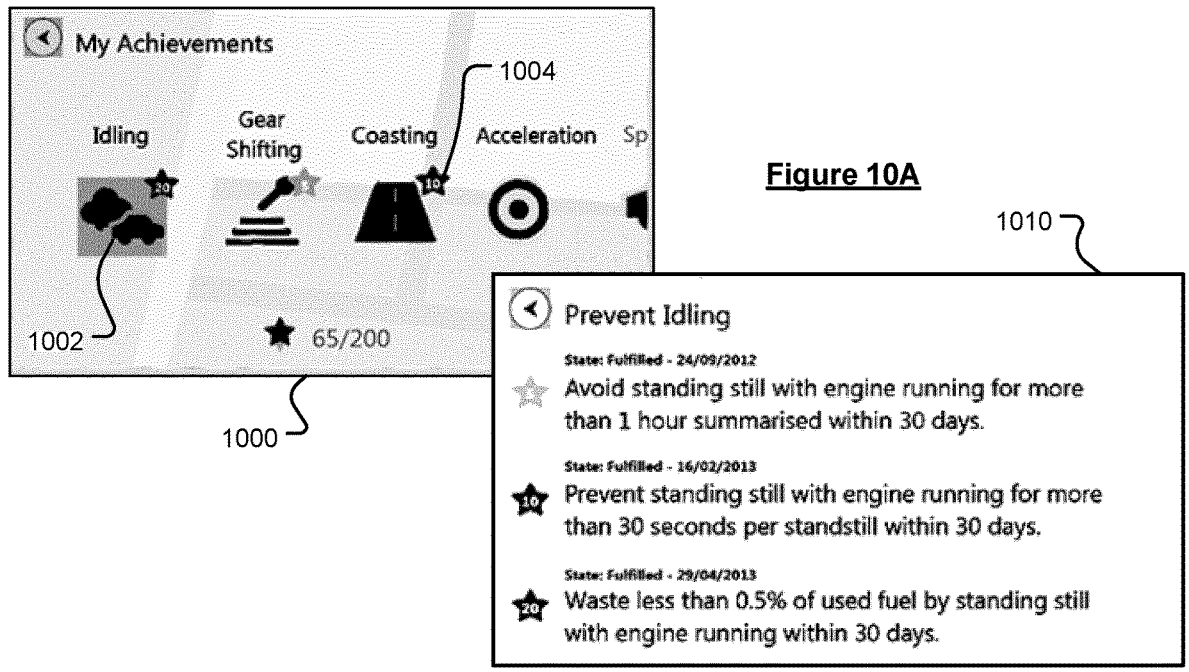
FIGS. 10A and 10B illustrates exemplary screens from a user interface according to an embodiment of the invention for outputting performance target compliance information.
Figure 10B:
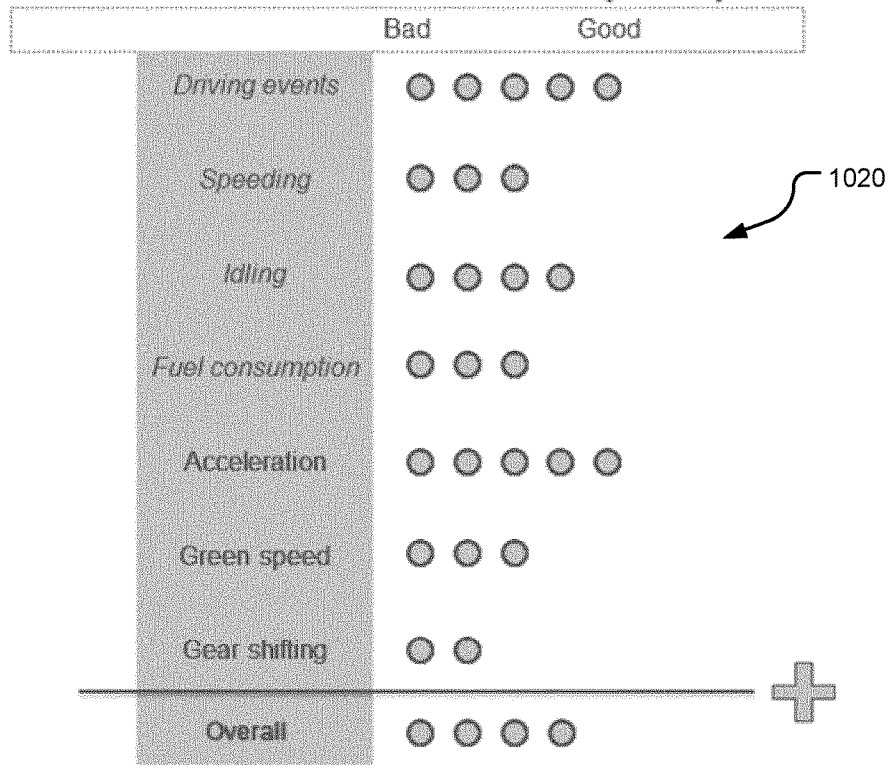

FIGS. 10A and 10B illustrate exemplary output screens 1000, 1010, 1020 providing information indicative of compliance with the one or more performance targets. The output screens may be provided by the navigation device, e.g. see FIG. 10A, or the computing device associated with the fleet manager, e.g. FIG. 10B.

As shown in FIG. 10A, a driver is able to see select a menu option 1002 associated with each type of performance data being monitored, e.g. idling, gear shifting, coasting, acceleration, etc, on screen 1000. Superimposed on the menu option is an indication, e.g. symbol 1004, of the achievement reached with respect to each performance data type. By selecting the menu option 1002, a further screen 1010 is shown providing details of the different achievement levels associated with each performance data type, and also indicating if and when a level was attained by the driver.

As shown in FIG. 10B, the exemplary screen 1020 comprises an indication of compliance with seven performance targets 1010 and an overall score based on individual scores for each performance target. It will be realised that the number of performance targets is merely exemplary. The screen further comprises an indication of a score 1020 associated with each performance target, such as an achievement of a desired fuel consumption for example. The score may be determined based on the performance data and the performance target data to provide an indication of a compliance or proximity of the performance data to the target. The overall score may be determined based upon the individual scores associated with each target.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example, the navigation device may utilise other global navigation satellite systems, such as the European Galileo system. Equally, it is not limited to satellite-based systems, but could readily function using ground-based beacons or other kind of system that enables the device to determine its geographic location.

It will also be well understood by persons of ordinary skill in the art that whilst the described embodiments implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of providing, by a device that comprises a processor and a memory, coasting information to a driver of a vehicle, the method comprising:
   determining, by the processor, an upcoming coasting area based on a current location of the vehicle and a current speed of travel of the vehicle, when the vehicle is travelling under the control of the driver, wherein said determining comprises:
      determining, by the processor, an end point location of the coasting area from digital map data, the digital map data comprising a plurality of segments representing roads of a road network traversable by the vehicle, and the end point location being a location on an upcoming segment in the digital map data of an expected decrease in speed of travel on the road represented by the segment from a first speed to a second speed, wherein the target speed associated with the coasting area is the second speed; and
      determining, by the processor, a start point location of the coasting area based on the end point location and a coasting distance, the coasting distance being determined based on a distance to reduce the current speed of travel of the vehicle to the target speed due to natural deceleration of the vehicle during coasting, without the vehicle being under power and without using brakes;
   determining, by the processor, a difference between the current speed of the vehicle and a target speed associated with the coasting area; and
   providing, by the processor, information indicative of the coasting area to the driver when the current speed of travel of the vehicle is determined to be greater than the target speed by at least a predetermined speed, the providing comprising outputting, to a display in the vehicle, an identification of a location of the coasting area on a route being displayed on the display and followed by the vehicle on the road network under the control of the driver.

2. The method of claim 1, comprising determining a distance, for each of a plurality of speeds between the current speed of travel of travel of the vehicle and the target speed, for the vehicle to decelerate to the next speed during coasting, and aggregating the determined distances to determine the length of the coasting area.

3. The method of claim 1, wherein the natural deceleration of the vehicle during coasting is determined based on at least one of: air resistance of the vehicle; engine resistance of an engine in the vehicle; and a gradient of a road segment.

4. The method of claim 1, wherein the plurality of segments of the digital map are each associated with a speed limit for the road represented by the segment, and wherein the expected decrease in speed from the first speed to the second speed represents a differential in speed limit.

5. The method of claim 1, wherein the plurality of segments of the digital map are each associated with a historical speed for the road represented by the segment, wherein the historical speed represents an expected speed of travel along the road represented by the segment, and wherein the expected decrease in speed from the first speed to the second speed represents a differential in historical speed.

6. The method of claim 1, comprising receiving traffic information indicative of segments, or portions thereof, of the digital map representing roads having congestion, e.g. due to an accident or a heavy volume of traffic, wherein the traffic information includes an expected speed of travel along the congested roads, and wherein the expected decrease in speed from the first speed to the second represents a differential in speed of traffic flow identified in the traffic information.

7. The method of claim 1, wherein the expected decrease in speed is due to a road feature, wherein the road feature is one of: a roundabout; a motorway exit; and an intersection.

8. The method of claim 1, wherein the predetermined speed is 20 kmh−1.

9. The method of claim 1, wherein the upcoming location of the coasting area is further determined based on a predetermined or predicted route on the road network being followed by the vehicle.

10. The method of claim 1, wherein the information indicative of the coasting area is provided as identification of the location of the coasting area includes:
    an icon on schematic view of the upcoming portion of a predetermined or predicted route on the road network being followed by the vehicle on the road network; or
    an overlay on a graphical depiction of the predetermined or predicted route.

11. A computing apparatus for providing coasting information to a driver of a vehicle, comprising:
    a processor; and
    a memory;
    wherein the processor is configured to:
        determine an upcoming coasting area based on a current location of the vehicle and a current speed of travel of the vehicle, when the vehicle is travelling under the control of the driver, wherein said determining comprises:
        determining an end point location of the coasting area from digital map data, the digital map data comprising a plurality of segments representing roads of a road network traversable by the vehicle, and the end point location being a location on an upcoming segment in the digital map data of an expected decrease in speed of travel on the road represented by the segment from a first speed to a second speed, wherein the target speed associated with the coasting area is the second speed; and
        determine a start point location of the coasting area based on the end point location and a coasting distance, the coasting distance being determined based on a distance to reduce the current speed of travel of the vehicle to the target speed due to natural deceleration of the vehicle during coasting, without the vehicle being under power and without using brakes;
        determine a difference between the current speed of the vehicle and a target speed associated with the coasting area; and
        provide information indicative of the coasting area to the driver when the current speed of travel of the vehicle is determined to be greater than the target speed by at least a predetermined speed, the providing comprising outputting, to a display in the vehicle, an identification of a location of the coasting area on a route being displayed on the display and followed by the vehicle on the road network under the control of the driver.

12. The computing apparatus of claim 11, wherein the computing apparatus is a server computer or a navigation device.

13. The method of claim 11, wherein the natural deceleration of the vehicle during coasting is determined based on at least one of: air resistance of the vehicle; engine resistance of an engine in the vehicle; and a gradient of a road segment.

14. The method of claim 11, wherein the plurality of segments of the digital map are each associated with a speed limit for the road represented by the segment, and wherein the expected decrease in speed from the first speed to the second speed represents a differential in speed limit.

15. The method of claim 11, wherein the upcoming location of the coasting area is further determined based on a predetermined or predicted route on the road network being followed by the vehicle.

16. A non-transitory computer readable storage medium storing instructions that, when executed by a processor of a computing device, cause the computing device to perform a method for providing coasting information to a driver of a vehicle, the method comprising:
    determining, by the processor, an upcoming coasting area based on a current location of the vehicle and a current speed of travel of the vehicle, when the vehicle is travelling under the control of the driver, wherein said determining comprises:
    determining, by the processor, an end point location of the coasting area from digital map data, the digital map data comprising a plurality of segments representing roads of a road network traversable by the vehicle, and the end point location being a location on an upcoming segment in the digital map data of an expected decrease in speed of travel on the road represented by the segment from a first speed to a second speed, wherein the target speed associated with the coasting area is the second speed; and
    determining, by the processor, a start point location of the coasting area based on the end point location and a coasting distance, the coasting distance being determined based on a distance to reduce the current speed of travel of the vehicle to the target speed due to natural deceleration of the vehicle during coasting, without the vehicle being under power and without using brakes;
    determining, by the processor, a difference between the current speed of the vehicle and a target speed associated with the coasting area; and
    providing, by the processor, information indicative of the coasting area to the driver when the current speed of travel of the vehicle is determined to be greater than the target speed by at least a predetermined speed, the providing comprising outputting, to a display in the vehicle, an identification of a location of the coasting area on a route being displayed on the display and followed by the vehicle on the road network under the control of the driver.

17. The method of claim 16, wherein the natural deceleration of the vehicle during coasting is determined based on at least one of:
    air resistance of the vehicle; engine resistance of an engine in the vehicle; and a gradient of a road segment.

18. The method of claim 16, wherein the plurality of segments of the digital map are each associated with a speed limit for the road represented by the segment, and wherein the expected decrease in speed from the first speed to the second speed represents a differential in speed limit.

19. The method of claim 16, comprising receiving traffic information indicative of segments, or portions thereof, of the digital map representing roads having congestion, e.g. due to an accident or a heavy volume of traffic, wherein the traffic information includes an expected speed of travel along the congested roads, and wherein the expected decrease in speed from the first speed to the second represents a differential in speed of traffic flow identified in the traffic information.

20. The method of claim 16, wherein the upcoming location of the coasting area is further determined based on a predetermined or predicted route on the road network being followed by the vehicle.

21. The method of claim 1, wherein the start point is determined dynamically according to a speed differential between the current vehicle speed and the target speed, together with the natural deceleration of the vehicle during coasting.

22. The method of claim 1, wherein the vehicle is in gear during coasting.

* * * * *